May 9, 1961     H. I. SCHER ET AL     2,983,305

BONDING PANELS TO BASE SURFACES

Filed Jan. 12, 1959

INVENTORS
Herbert I. Scher
John S. Dunn

BY Karl W. Flocks

ATTORNEY

United States Patent Office 2,983,305
Patented May 9, 1961

2,983,305
BONDING PANELS TO BASE SURFACES
Herbert I. Scher and John S. Dunn, Baltimore, Md., assignors to National Plastic Products Co., Odenton, Md., a corporation of Maryland
Filed Jan. 12, 1959, Ser. No. 786,433
10 Claims. (Cl. 154—41)

This invention relates to methods of bonding panels to base surfaces, and more particularly to methods of bonding planular decorative laminates to wall surfaces and the like.

Planular decorative laminates, or other types of panels, are often used to provide decorative and protective surfaces on walls, doors and table tops, as well as bar and counter tops, and the like. In the bonding of such panels to the base surfaces numerous problems have been encountered. For example, when nails or screws are used for this purpose, it is necessary to employ an elaborate finishing treatment to hide the nail or screw heads in the joints between adjacent panels. Contact cements have sometimes been employed to supply the required bond, but the bonding power and the durability of such cements have often been inadequate. The application of mechanically applied pressure to hold the panels in position during the curing of thermosetting adhesives or glues has usually been accomplished by means of a complicated jigging of clamps, braces, wedges and struts. This complicated procedure was not only expensive and laborious, but it often caused ripples or other surface defects to appear on the panels, due to the localized application of the pressure.

The advantages offered by modern high strength, low cost, resinous thermo-setting adhesives have been well known, but these adhesives generally require the application of relatively high pressures to effect curing thereof. In attempting to mount large panels on wall surfaces, and the like, by the methods practiced heretofore, it has been manifestly difficult, if not impossible, to apply such high pressures uniformly over the entire area of the panels during the curing of the adhesive applied thereto. In certain manufacturing operations involving the use of these adhesives as bonding agents, it has been customary to insert the articles being bonded into a flexible chamber, such as a rubber bag, which is then evacuated for the purpose of utilizing the resultant pressure differential created by the atmosphere on the exterior of the evacuated bag to hold the articles under high uniform pressure during curing of the adhesive. This evacuated rubber bag method is effective to create pressures which are adequately high and uniform for the bonding of articles by the thermosetting type adhesives. However, for the mounting of large panels on wall surfaces and the like, obviously it has not been feasible to utilize the above-described evacuated rubber bag method, and this problem is complicated by the fact that no direct access can normally be had to the rear of the panel or to the wall surface to which it is being applied, for connection with a source of suction to effect evacuation.

An object of the present invention is to provide new and improved methods for bonding panels to base surfaces.

A specific object of the invention is to provide new and improved methods for bonding planular decorative laminates to wall surfaces, and the like.

Another object of the invention is to provide new and improved methods of applying high pressures uniformly to panels being bonded to base surfaces.

Still another object of the invention is to provide simplified and inexpensive methods for creating a vacuum beneath large panels being bonded to wall surfaces, and the like, to utilize the exterior normal atmospheric pressure as the required uniformly applied high pressure for curing resinous thermosetting adhesive bonding agents.

Other objects and the nature and advantages of the invention will be apparent from the following detailed description, when considered in conjunction with the accompanying drawing, wherein.

Figure 1:
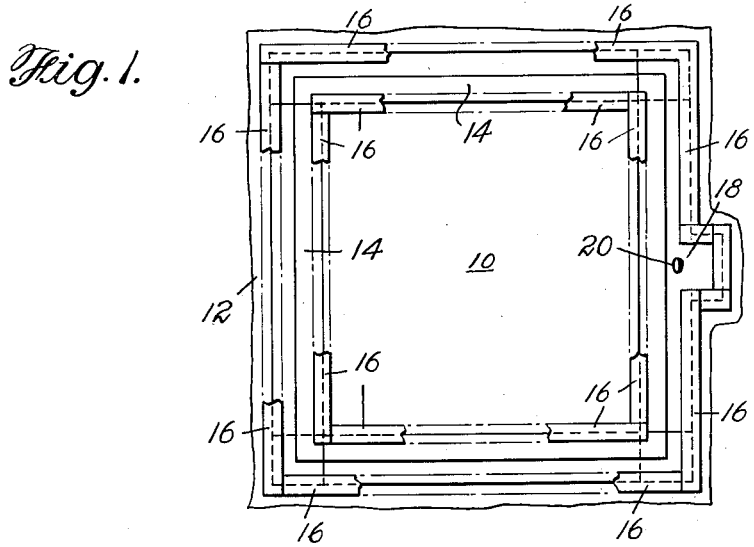
Fig. 1 is a plan elevation view of a planular decorative laminate being bonded to a base surface in accordance with a method embodying the invention.

One well known type of decorative laminate is constructed from a core composed of several superposed sheets of kraft paper impregnated with a phenol-formaldehyde thermosetting resin, superimposed on said core is a print or pattern sheet composed of alpha cellulose paper impregnated with a melamine-formaldehyde resin, and covering the print sheet is a translucent or transparent protective overlay sheet composed of alpha cellulose or rayon impregnated with a melamine-formaldehyde resin, all of said sheets being consolidated by application thereto of high pressures and elevated temperatures to produce a finished planular laminate. Decorative laminates of this type often exhibit a pronounced tendency to become warped, which is noticeable in the laminates as soon as they are produced and becomes progressively more pronounced during any subsequent prolonged storage. Such warpage is manifested by transverse curling wherein the laminates become arcuate in cross-section, and usually the decorative melamine resin impregnated top surface of the laminates becomes concave in contour. However, in some instances the top surface may instead become convexly warped, and in other panels no substantial warpage may occur. In any event, it is important to overcome any warpage and to bond the panels flatly to the base surfaces which are to be decorated or protected thereby.

In order to simplify the work of mounting panels, it is desirable to employ large panels to effect a corresponding reduction in the number of units required to cover a given area. For example, a single decorative laminate panel may be employed to cover an entire table top, or to cover a wall section of a room extending substantially from the ceiling to the floor thereof. It is evident that the large size of such panels creates additional problems in any attempt to hold such a panel in mounting position, and particularly in the application of high pressures uniformly over the entire surface thereof, such as would be required for the curing of certain resinous adhesive bonding agents. The contact type cements employed in the methods known heretofore have not required the application of such high pressures for curing thereof. The utilization of methods embodying the present invention for holding such panels in place and for uniformly applying high pressures there, permits the use of high strength, low cost, resinous thermosetting adhesives as the bonding agent.

In accordance with the present invention, panels are bounded to base surfaces by resinous thermosetting adhesives requiring the application of high pressures for proper curing thereof, and such pressures are created by evacuation of the atmosphere from around and beneath the panel being mounted, whereby normal atmospheric pressure forces the panel against the base surface to which it is being bonded. The panel is temporarily framed or covered by disposable plastic strips or sheets which are sealed air tight therearound, and are provided on the periphery thereof with a connecting member adapted to provide communication with a source of vacuum. After the vacuum created pressure has been applied for a predetermined period of time sufficient for the thermosetting resin to have substantially completely cured, the plastic strips or sheets may be removed and discarded or reused.

It is evident that the base surface to which a panel is secured by methods embodying the invention must be relatively rigid and non-porous or air-impervious. Wall surfaces should be previously tested to determine their porosity. If necessary the base surfaces may be suitably treated to prevent air leakage. Thus, if the base or mounting surface is constructed from plywood or hardwood lumber sections, the butt joints between sections should be sealed with wood putty or caulking compound, and any protruding nail heads should be driven flush with the mounting surface.

Figure 2:
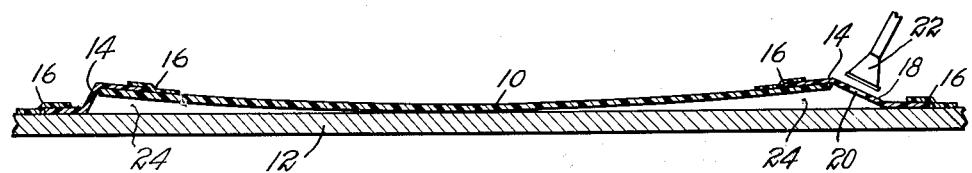
Fig. 2 is a vertical section taken along the line 2—2 of Fig. 1.

Referring to Figs. 1 and 2, a rectangular decorative laminate panel 10 is shown being affixed to a flat base surface 12, such as a table top or a wall of a room. By way of example, in this instance the panel 10 is generally planular, but it is slightly concavely warped, so that its center portion rests in contact with the base 12 and the outer edges of the panel 10 jut upwardly therefrom. An airtight seal between the base surface 12 and the edges of the panel 10 is formed by placing along each edge of the panel 10 a plastic strip 14, which overlaps a portion of the base 12 and the adjacent edge of the panel 10. The plastic strips 14 should be made from a relatively strong, semi-rigid material, such as five to ten mil thickness unplasticized polyvinyl chloride sheeting, so that the strips will not burst or collapse when a vacuum is created on one side thereof. Although the strips 14 may themselves be made adhesive, or they may have an adhesive coating applied on one side thereof, it is preferable to secure the strips 14 in the above-described overlapping position and form an airtight seal therewith by overlapping the opposite edges of the strips 14 with sections 16 of thin, flatback, pressure sensitive paper adhesive tape.

The four side edges of the rectangular panel 10 may be covered in overlapping relation by four of the strips 14 applied separately in succession, or the four strips 14 may be previously united at their ends to form in effect a unitary peripheral frame for the panel 10. It is evident that it is more convenient to utilize separate strips, since they may be readily cut from a large roll to the desired length, thereby easily fitting panels of different sizes.

Figure 3:
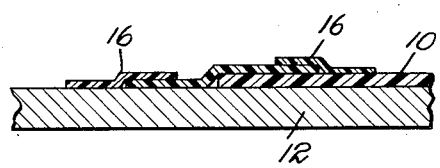
Fig. 3 is an enlarged vertical section of a portion of the laminate shown in Figs. 1 and 2 at a subsequent stage of the method.

One of the four strips 14, or one side of any unitary peripheral frame substituted therefor, is provided with an outwardly projecting extension 18 having an aperture 20 formed therein for connection with a suitable outside source of suction. In Fig. 2 a suction cup 22 is shown being placed in operative position covering the aperture 20, and suitable adhesive tape may be used to seal it in said position. Due to the concave warpage of the panel 10, tapered spaces 24 are formed beneath the upwardly jutting edges thereof prior to the application of the suction. After the suction is applied the edges of the panel 10 are forced downwardly by the normal exterior atmospheric pressure until said edges rest flatly in contact with the base surface 12, as shown in Fig. 3. It should be observed that the plastic strips 14 remain uncollapsed despite the relatively strong vacuum existing therebeneath, thereby providing a peripheral channel leading to the aperture 20 for sucking the atmosphere from around all four sides and from beneath the panel 10.

Usually it is advisable to test the base surface for porosity and air leakage before applying the thermosetting adhesive employed as the bonding agent between said surface and the back of the panel. This may be accomplished by placing the panel 10 in its desired ultimate position in the manner described in detail hereinabove, applying a vacuum of at least about ten inches of mercury, and determining how well the vacuum holds while the vacuum pump continues to operate. If it is determined that the vacuum holds satisfactorily, the panel 10 and its assembly of plastic strips 14 and adhesive tapes 16 is carefully removed from the base surface 12 without tearing or otherwise disturbing the strips and tapes. The base surface 12 is next covered with a layer of a suitable resinous thermosetting adhesive. In placing the layer of adhesive between the panel and the base surface, it is evident that the adhesive may be applied either to the panel or to the base surface. Then the panel 10 is returned to its former position on the base surface. The plastic strips 14 and the adhesive tapes 16 are carefully pressed into position again to form an airtight seal, and the suction cup 22 is placed over the aperture 20 to create a vacuum around and beneath the panel 10. This vacuum is maintained for from about thirty minutes to about three hours, depending upon the speed of curing of the particular adhesive used. At the end of this time, the strips 14 and the tapes 16 may be removed, and it will be found that the panel 10 is securely and uniformly bonded to the base surface.

The resinous adhesive employed may be any of many well known varieties requiring high pressures to effect curing thereof. A commercially available modified urea-aldehyde adhesive has been found to give good results. Certain acidic catalysts may be incorporated into the adhesive to accelerate its curing rate, but care must be taken to establish a proper balance between bond stability and curing speed, since excess acid may cause degredation of wall surfaces made of wood or other cellulose products.

The size of the panel being applied is limited slightly by the fact that marginal space should be provided for temporarily mounting the plastic strips and the adhesive tapes used in the bonding operation. Thus, a panel being mounted on a wall of a room should not extend completely from the ceiling to the floor thereof. However, ceiling furring may be subsequently installed to cover the top edge of such a panel, and a baseboard would normally cover the bottom edge thereof.

Figure 4:
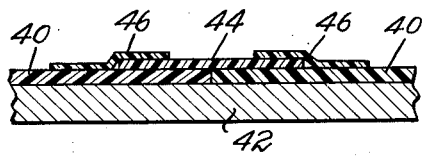
Fig. 4 is a vertical section, corresponding to Fig. 3, of a portion of a laminate being bonded to a base surface adjacent to a previously mounted laminate.

Fig. 4 simply shows the manner in which one panel may be mounted directly adjacent to a previously erected panel. In this view a pair of decorative laminate panels 40 are mounted edgewise close to each other on a flat base surface 42. Either one of the panels 40 may be considered as having been previously bonded to the base 12, and the other one of these panels is shown in the process of being mounted. A plastic strip 44, corresponding to one of the previously described strips 14, overlaps the adjacent edges of the two panels 40, and suitable lengths of adhesive tape 46 overlap the edges of the strip 44, thereby forming an airtight seal therewith. A vacuum is then applied for the duration of the curing cycle of the resinous adhesive bonding agent, in the same manner as has been described in regard to the embodiment of the invention illustrated in Figs. 1 and 2.

Figure 5:
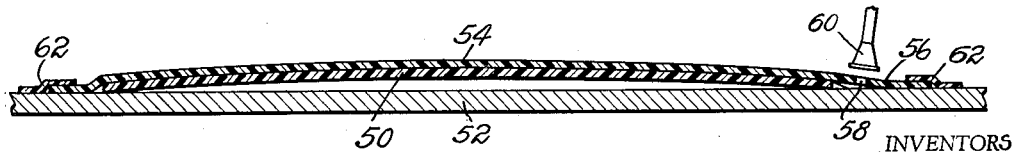
Fig. 5 is a transverse vertical section, generally corresponding to Fig. 2, of a planular decorative laminate shown being bonded to a base surface in accordance with a method constituting a second embodiment of the invention.

In Fig. 5 a decorative laminate panel 50, which is slightly convexly warped, is shown in the process of being prepared for attachment to a flat base surface 52. Because of the convex warpage of the panel 50, its side edges contact the base surface 52, but its center portion protrudes upwardly above said surface. It is possible to bond the panel 50 to the base 52 by using a plurality of plastic strips and lengths of adhesive tape in exactly the same manner described for the panel 10 shown in Figs. 1 and 2. However, in view of the fact that the side edges of the convexly warped panel 50 tend to creep outwardly when the panel becomes flattened by the application of suction therebeneath, this creeping action may cause disruption of such strips and consequent breaking of the airtight seal. Therefore, it is preferred to cover the entire upper side of the panel 50 and also to overlap its four side edges by means of a unitary plastic sheet 54, which may otherwise correspond in composition and in thickness to that of the previously described plastic strips 14. One side edge of the sheet 54 is provided with an outwardly projecting extension 56 having an aperture 58 formed therein for communication with a suction cup 60. A plurality of sections 62 of pressure sensitive adhesive tape overlap the edges of the sheet 54 and its extension 56 to form an airtight seal with the base surface 52. The step of first testing the base surface for air leakage, and the other steps of the bonding procedure, are performed in the same manner as has been previously described.

The use of a unitary plastic sheet for entirely covering a panel and also overlapping its four side edges, as shown in Fig. 5, may also be employed advantageously when it is desired to bond panels to curved base surfaces. Similarly, specially contoured panels, such as post-formed decorative laminates, may be successfully bonded by this method to curved base surfaces, without employing the heretofore customary jigging and clamps.

It will be obvious to those skilled in the art that various changes may be made without departing from the spirit of the invention, and therefore the invention is not limited to what is shown in the drawings and described in the specification, but only as indicated in the appended claims.

What is claimed is.

1. A method of bonding panels to base surfaces, comprising the steps of applying a layer of a resinous thermosetting adhesive between a panel and a base surface, placing the panel upon said surface in position to be bonded thereto by the adhesive, placing a sealing strip along the peripheral edges of the panel to form an airtight seal between said edges and said surface, providing a connection with a source of suction through said strip at one edge of the panel, applying a vacuum from said source to evacuate the air from around the edges and beneath the panel, whereby the panel is forced against said surface by normal exterior atmospheric pressure, maintaining the vacuum until the thus applied pressure has caused the adhesive to become cured, and then removing the sealing strip.

2. A method of bonding panels to base surfaces, comprising the steps of applying a layer of a resinous thermosetting adhesive between a panel and a base surface, placing the panel upon said surface in position to be bonded thereto by the adhesive, covering the peripheral edges of the panel with a sealing strip in overlapping relation with the base surface to form an airtight seal therewith, providing a connection with a source of suction through said strip at one edge of the panel, applying a vacuum from said source to evacuate the air from around the edges and beneath the panel, whereby the panel is forced against said surface by normal exterior atmospheric pressure, maintaining the vacuum until the adhesive has cured, and then removing the sealing strip.

3. The method defined by claim 2, wherein the peripheral edges of the panel are covered by a plurality of individual strips applied separately in succession, and one of said individual strips is provided with an aperture for forming a connection with the source of suction.

4. The method defined by claim 2, wherein the peripheral edges of the panel are covered by a peripheral frame constructed from a plurality of strips united at their ends and applied as a single unit, and one side of said frame is provided with an aperture for forming a connection with the source of suction.

5. A method of bonding panels to base surfaces, comprising the steps of applying a layer of a resinous thermosetting adhesive between a panel and a base surface, placing the panel upon said surface in position to be bonded thereto by the adhesive, covering the panel including its peripheral edges with a sealing sheet in overlapping relation with the base surface to form an airtight seal therewith, providing a connection with a source of suction through said sheet at one edge of the panel, applying a vacuum from said source to evacuate the air from around the edges and beneath the panel, whereby the panel is forced against said surface by normal exterior atmospheric pressure, maintaining the vacuum until the adhesive has cured, and then removing the sealing sheet.

6. A method of bonding panels to base surfaces, comprising the steps of applying a layer of a resinous thermosetting adhesive between a panel and a base surface, placing the panel upon said surface in position to be bonded thereto by the adhesive, placing a plastic strip along each of the peripheral edges of the panel in overlapping relation with the base surface, sealing said strips to the panel and the base surface to form an airtight seal therebetween, providing a connection with a source of suction through one of said strips at one edge of the panel, applying a vacuum from said source to evacuate the air from around the edges and beneath the panel, whereby the panel is forced against said surface by normal exterior atmospheric pressure, maintaining the vacuum until the adhesive has cured, and then removing the strips.

7. The method defined by claim 6 wherein the plastic strips are sealed to the panel and to the base surface by applying a pressure sensitive adhesive tape along the edges of the strips in overlapping relation thereto.

8. The method defined by claim 6 wherein the plastic strips placed along each of the peripheral edges of the panel are applied separately in succession, and one of said strips is provided with an aperture for forming a connection with the source of suction.

9. A method of bonding panels to base surfaces, comprising the steps of applying a layer of a resinous thermosetting adhesive between a panel and a base surface, placing the panel upon said surface in position to be bonded thereto by the adhesive, covering the entire top of the panel including its peripheral edges with a plastic sheet in overlapping relation with the base surface, sealing the edges of said sheet to the base surface to form an airtight seal, providing a connection with a source of suction through said sheet at one edge of the panel, aplying a vacuum from said source to evacuate the air from around the edges and beneath the panel, whereby the panel is forced against said surface by normal exterior atmospheric pressure, maintaining the vacuum until the adhesive has cured, and then removing the plastic sheet.

10. The method defined by claim 9 wherein the edges of the sheet are sealed to the base surface by applying a pressure sensitive adhesive tape along the edges of the sheet in overlapping relation thereto.

References Cited in the file of this patent

UNITED STATES PATENTS

| 1,971,384 | Ritter | Aug. 8, 1934 |
| 2,101,996 | Gerstenberg | Dec. 14, 1937 |
| 2,155,445 | Pittenger | Apr. 25, 1939 |
| 2,236,552 | Ushakoff | Apr. 1, 1941 |
| 2,731,654 | Nowak | Jan. 24, 1956 |
| 2,781,077 | Davidio | Feb. 12, 1957 |
| 2,828,799 | Harrison | Apr. 1, 1958 |